April 7, 1953    H. G. ALLEN ET AL    2,634,085
APPARATUS FOR WEIGHING AND PACKAGING MATERIALS
Filed Dec. 22, 1948    5 Sheets-Sheet 1

INVENTORS
Howard G. Allen
Harry A. Smith
BY
Parker, Prochnow & Farmer,
Attorneys.

April 7, 1953 H. G. ALLEN ET AL 2,634,085
APPARATUS FOR WEIGHING AND PACKAGING MATERIALS
Filed Dec. 22, 1948 5 Sheets-Sheet 2
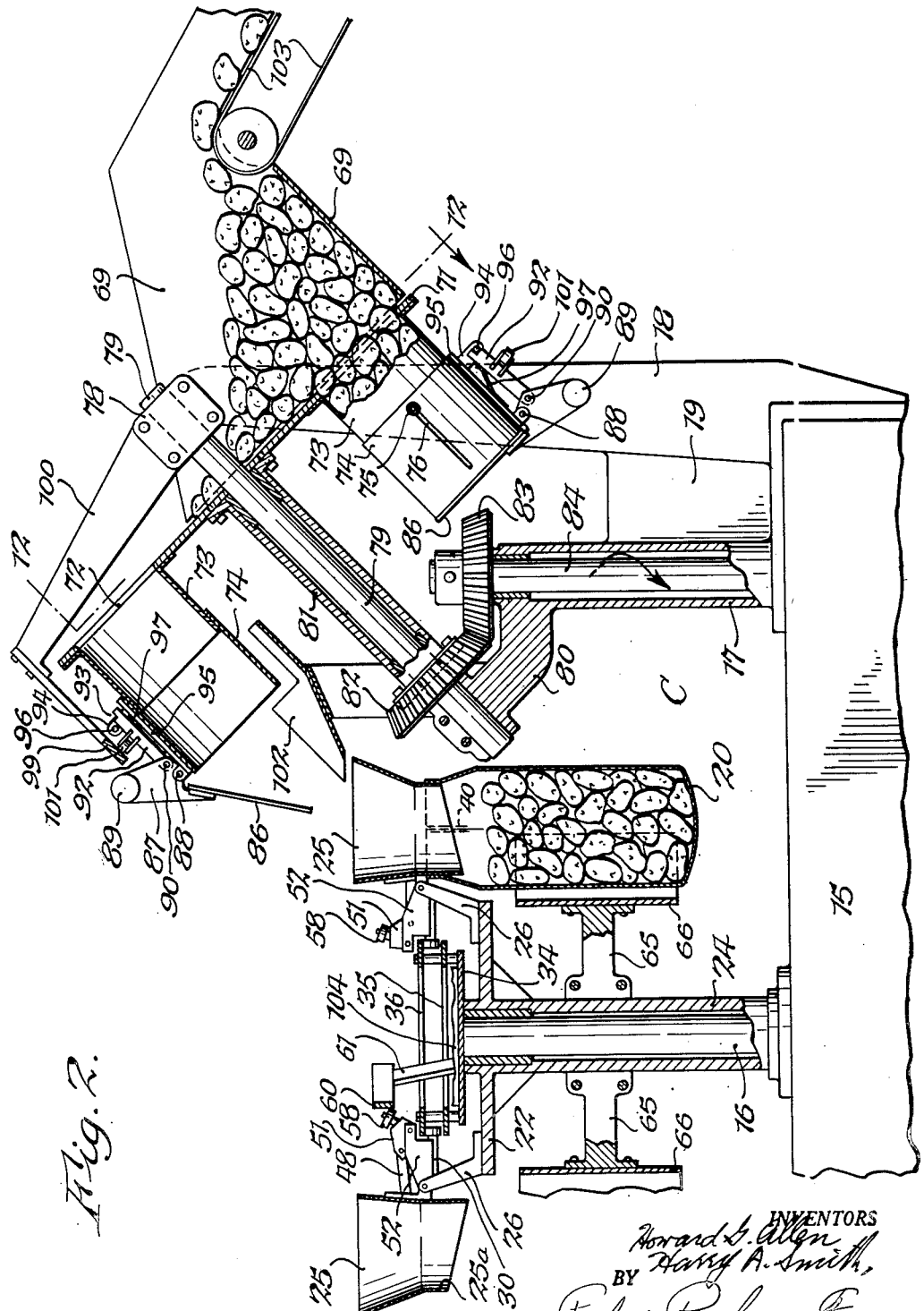

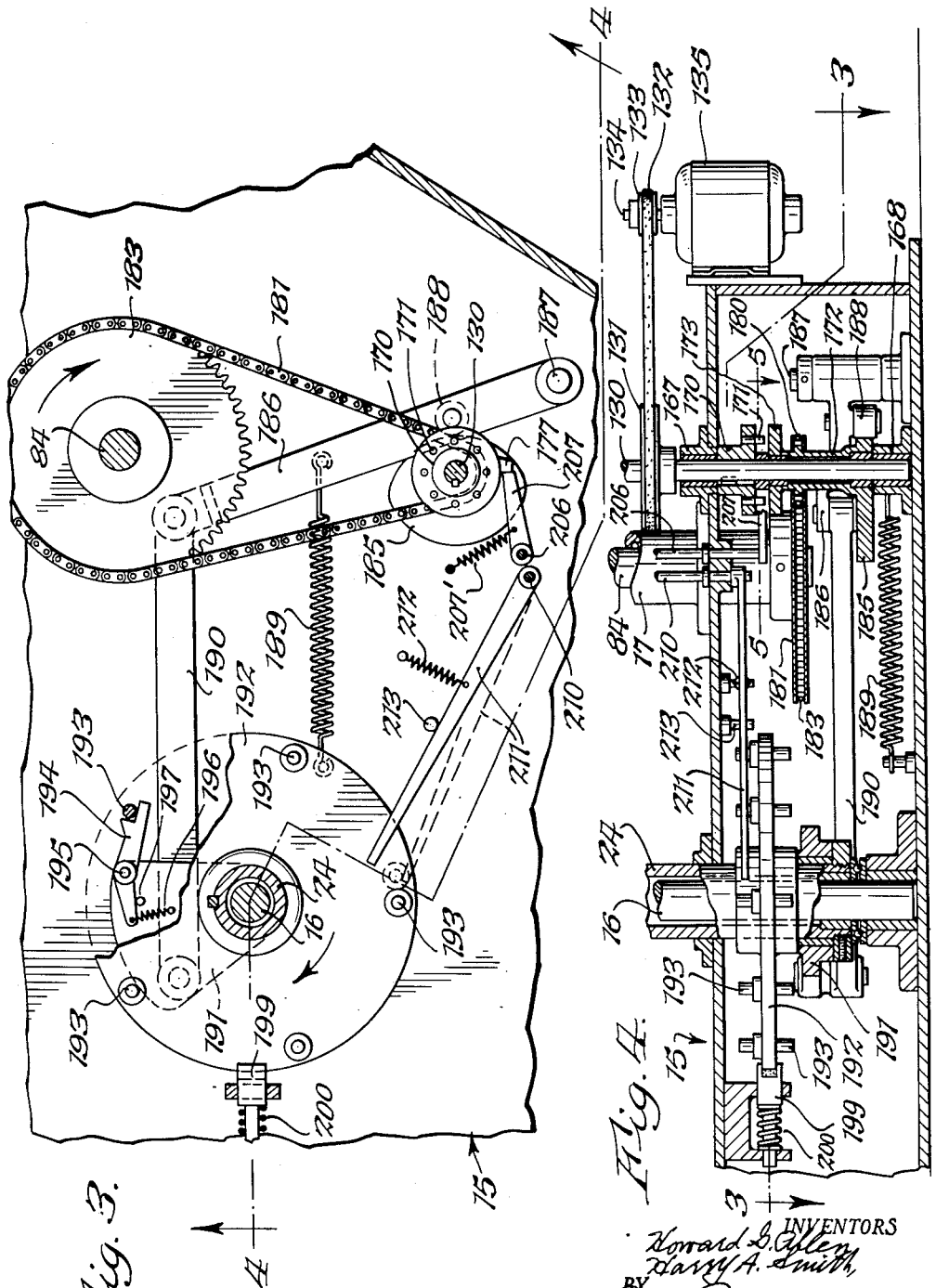

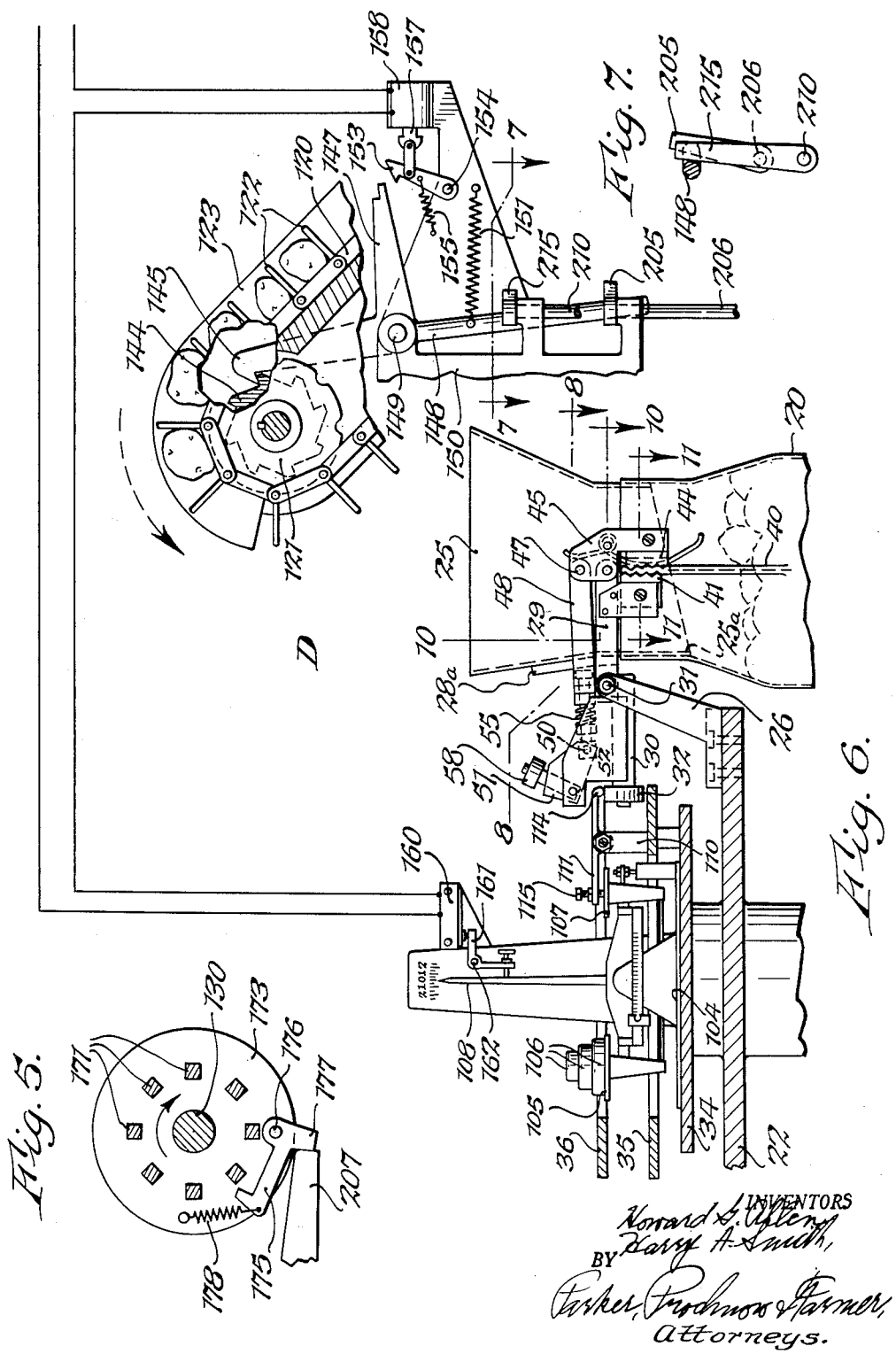

April 7, 1953 H. G. ALLEN ET AL 2,634,085
APPARATUS FOR WEIGHING AND PACKAGING MATERIALS
Filed Dec. 22, 1948 5 Sheets-Sheet 5
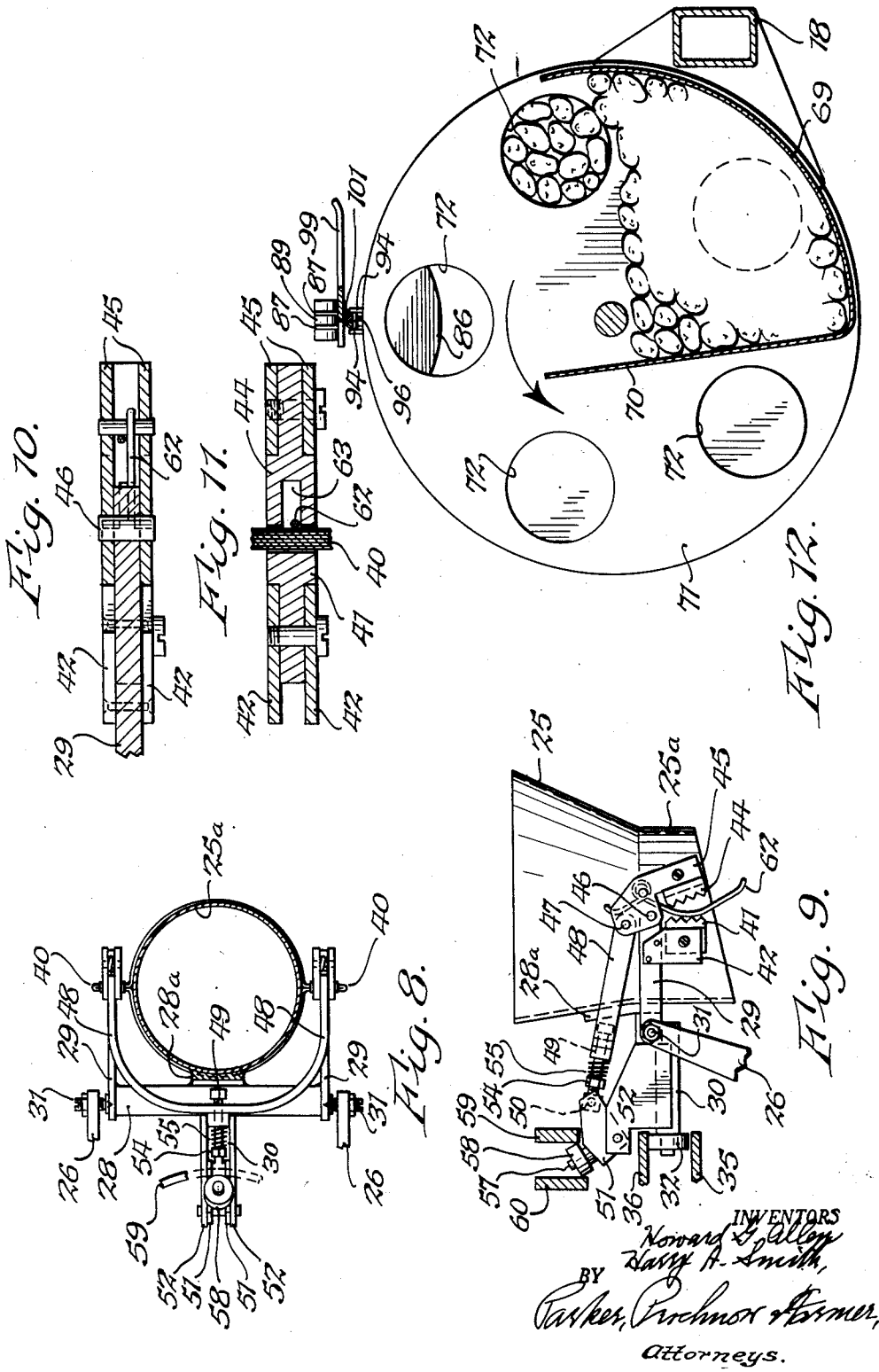

Patented Apr. 7, 1953

2,634,085

UNITED STATES PATENT OFFICE 2,634,085

APPARATUS FOR WEIGHING AND PACKAGING MATERIALS

Howard G. Allen, Niagara Falls, and Harry A. Smith, Gowanda, N. Y.; said Allen assignor to said Smith Application December 22, 1948, Serial No. 66,602

7 Claims. (Cl. 249—59)

This invention relates to improvements in machines for filling bags or other containers with articles or materials in such a manner that all of the filled containers will be of approximately the same weight.

One of the objects of this invention is to provide a machine of this type in which a preliminary quantity of material less than the final weight desired is placed into a container and in which small quantities of the material are then supplied to the container until the same reaches the desired weight. A further object is to provide a machine of this type including an intermittently movable member having a station at which the containers are attached to the movable member, another station at which a measured volume of material is discharged into the containers, and another station at which smaller quantities of the material are gradually added to the container until the same has the required weight. Another object is to provide a machine of this type in which the containers after having received the preliminary charge of material are operatively connected one at a time with a scale while receiving the smaller quantity of material. A further object is to provide a machine of this type in which the intermittent rotation of a turret is controlled by a scale which interrupts the final feed of material to the container when the same has attained the required weight. A further object is to provide container holding supports which are moved successively to and cooperate with a scale while receiving a final weight of material. A further object is to provide an improved mechanism for removing buckets containing measured quantities of material from a side of the supply bin in such a manner that damage to the material is avoided. Another object is to provide a machine in which the containers in travelling through the machine are partly supported by a track having a portion thereof cut away and having a part connected with the scale arranged at the cut away portion and on which the containers are partly supported for determining the weights of the containers during the final supply of material thereto. It is also an object of this invention to provide mechanism of improved construction for controlling the feed of material to the containers while supported on the scale. A further object is to provide scale controlled mechanism for advancing the containers through the machine.

Other objects and advantages will be apparent from the following description of one embodiment of the invention and the novel features will be particularly pointed out hereinafter in connection with the appended claims.

In the accompanying drawings:

Fig. 2 is a fragmentary sectional elevation thereof, taken approximately on line 2—2, Fig. 1.

Fig. 3 is a fragmentary sectional plan view of the lower portion of the machine approximately on line 3—3, Fig. 4.

Fig. 4 is a fragmentary sectional elevation thereof, on line 4—4, Fig. 3.

Fig. 5 is a fragmentary sectional plan view thereof, on line 5—5, Fig. 4.

Fig. 6 is a fragmentary sectional elevation thereof approximately on line 6—6, Fig. 1, and showing the mechanism for supplying the final amount of material to the container while supported on the scale.

Fig. 7 is a fragmentary plan view thereof, partly in section on line 7—7, Fig. 6.

Fig. 8 is a fragmentary sectional elevation thereof, on line 8—8, Fig. 6, showing a funnel or chute through which the material is supplied to the containers.

Fig. 9 is an elevation, partly in section, of the mechanism shown in Fig. 8, the section being taken on line 9—9, Fig. 1.

Figure 1:
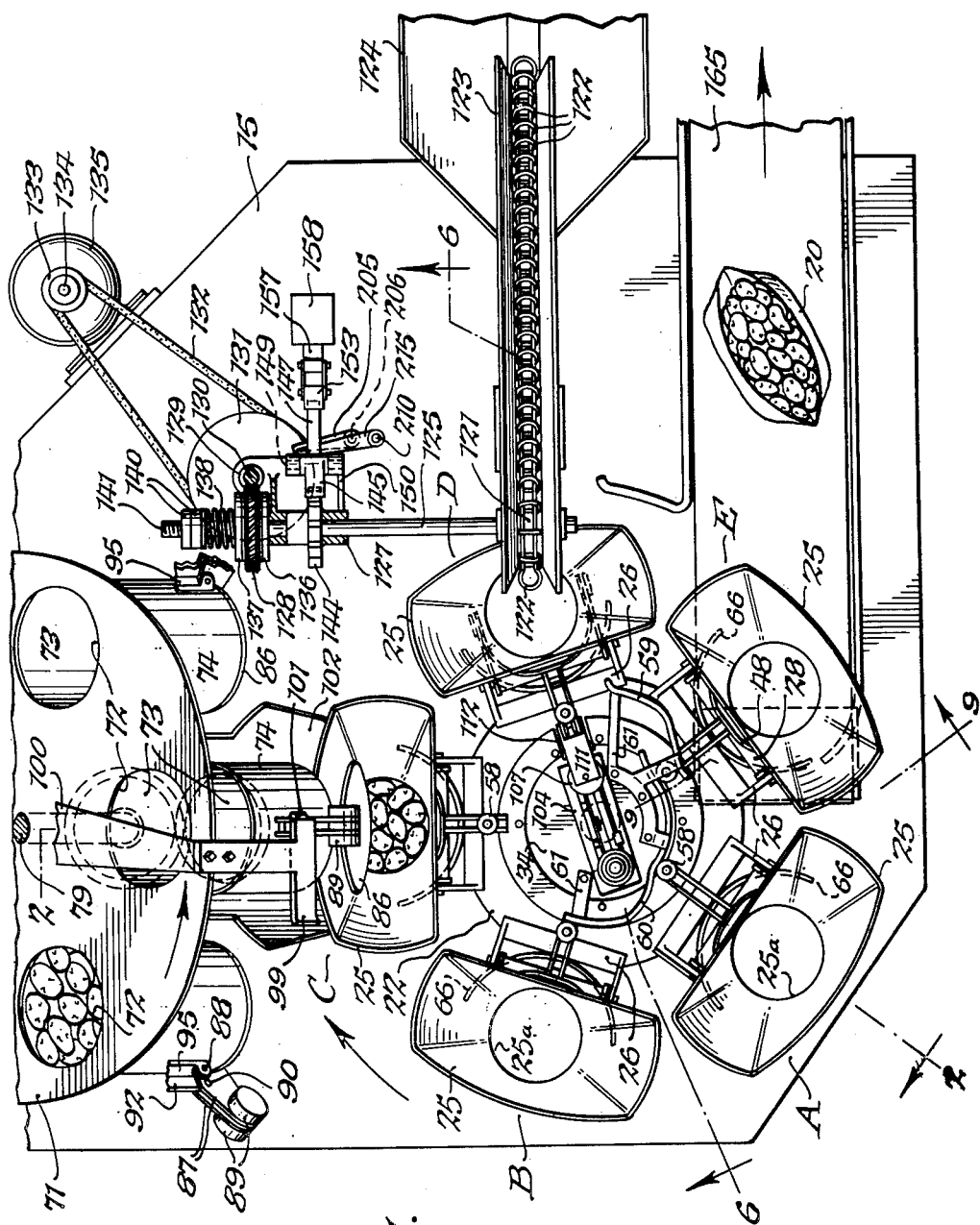
Fig. 1 is a fragmentary top plan view of a container filling and weighing machine embodying this invention.

Figs. 10 and 11 are fragmentary sectional plan views on lines 10—10 and 11—11 respectively, Fig. 6.

Fig. 12 is a view, partly in section, taken along line 12—12, Fig. 2.

The machine is shown in the accompanying drawings by way of example as applied for bagging potatoes, but it will be understood that the machine may be used for placing any other articles or materials into containers of any suitable or desired type.

The particular machine shown in the drawing includes a base 15 which is preferably hollow to house a part of the mechanism, the remainder of the mechanism may be mounted above the base in any suitable or desired manner, and in the construction shown, the base is provided with an upwardly extending stationary column or shaft 16, an upwardly extending tubular column or standard 17 and an arm 18 which also extends upwardly to support the bulk dispensing mechanism. The arm 18 and the column 17 may, if desired, be connected by means of a web 19. Other means for supporting parts of the machine above the base may be provided, if desired.

The bags or other containers 20 to be filled may be mounted on any suitable or desired carriers therefor, which are moved intermittently to present the containers 20 at the various stations of the machine. In the construction shown for this purpose, the carriers are mounted on a turret or rotary table 22 secured on a tube or hollow shaft 24 which is mounted to rotate about the stationary upright column 16 and which may be turned intermittently by means of suitable mechanism arranged within the hollow base 15 and which will be hereinafter described. The turret shown in the particular construction illustrated is provided with five container carriers or supporting devices, each of which includes an upwardly and outwardly flaring chute or funnel 25 formed to receive the material and which converges downwardly and terminates in a substantially cylindrical portion 25a which extends into the container while supported on its carrier, to discharge the material into the container. The table or turret has five upwardly and outwardly extending pairs of arms 26 secured thereto, on which the carriers or supports for the containers are pivotally mounted. Each container carrier or support includes a cross member 28 on one side of which the funnel 25 and the containers are supported in any suitable manner. In the construction shown, the chute or funnel 25 may be rigidly secured to the cross member 28 in any suitable manner, for example, by means of an arm or plate 28a rigidly secured or welded to the funnel 25 and to the cross member 28 as clearly shown in Figs. 8 and 9. When the containers are in the form of bags, they may, for example, be supported from the carrier as follows: The cross member is provided with outwardly extending arms 29 on which suitable jaws or clamping members are arranged for supporting the containers in correct relation to the lower part 25a of a funnel or chute 25. The cross member 28 also has an inwardly extending arm 30 rigidly secured thereto intermediate of the ends of the cross member 28, see particularly Figs. 2, 6, 8 and 9. The container supporting member may be pivotally mounted on the brackets 26 in any suitable or desired manner, and in the construction illustrated, pivot pins 31 are suitably secured on the outer ends of arms 26 and have pointed ends extending into holes in the arms 29 so that the container carrier support may pivot on the arms 26. Pivots of any other suitable or desired type may be employed, if desired. The inwardly extending arm 30 is provided at the outer end thereof with a roller 32.

Above the table 22 there is provided a stationary disk or support 34, Figs. 2 and 6, which is rigidly secured to the upper end of the stationary post or column 16, and annular tracks 35 and 36 are mounted one above the other on the stationary support 34. The wheel or roller 32 of the container carrier, as clearly shown in Figs. 2 and 9, is arranged between these two tracks 35 and 36 so that the carrier will be held against swinging about the pivots 31 in either direction. Normally the weight of the funnel and the container tends to swing the carrier about its pivot pins 31 so that the roller 32 bears against the upper track 36.

The lower portions 25a of the funnels are of somewhat smaller circumference than the periphery of the containers so that the upper portions of the containers may be readily slid about the lower or discharge portions 25a of the funnels. When bags are being filled, portions of the bags at opposite sides of the portions 25a of the funnel members are gathered together to form folds 40, see particularly Fig. 8, which folds may then be gripped during the filling of the bags to support the bags in correct relation to the funnels and on the container carriers.

Any suitable means for gripping the bags may be provided, and in the construction illustrated, each of the outwardly extending arms 29 of the container carriers is provided with a fixed jaw 41, which may be mounted between a pair of plates 42 secured to opposite sides of the outwardly extending arm 29. 44 represents a movable jaw arranged to move toward and from the fixed jaw 41 and mounted on a lever 45 comprising a pair of plates pivoted at 46 on the outer end of the outwardly extending arm 29.

The two levers 45 are pivotally connected at 47 to the outer ends of a yoke member 48, the intermediate portion of which is provided with an aperture through which a bolt 49 extends in such manner as to slide lengthwise through the aperture. The inner end of the bolt 49 is pivoted at 50 between a pair of plates 51 which in turn are pivoted on a bracket in the form of a pair of plates 52 secured to opposite sides of the arm 30 of the container carrier. The bolt 49 has a nut or other shouldered portion 54 thereon and a spring 55 is interposed between the nut 54 and the yoke member 48. There is also secured to the pair of plates 52 a stud or bearing pin 57 on which a roller 58 is rotatably mounted. This roller is formed to engage with a pair of fixed cams 59 and 60, see particularly Fig. 1. These cams may be supported in any suitable or desired manner, for example, by means of arms 61 extending upwardly from the fixed disk 34.

It will be obvious from the foregoing description, that the yoke member 48 and the pair of plates 51 constitute a toggle mechanism by means of which the movable jaw may be actuated. In Fig. 9, the jaws are shown in open or bag releasing position, having been moved into that position by means of the cam 59 engaging the roller 58. When, however, the roller 58 engages the outwardly extending portion of the cam 60, the roller 58 will be moved into the opposite direction into the position shown in Fig. 6 in which the toggle members have moved through and beyond their dead center position so that the yoke member 48 of the toggle mechanism rests against the cross member 28 of the container carrier. The spring 55 serves to hold the movable jaws in their position adjacent to the fixed jaws for gripping a bag or other container and enables the jaws to cooperate with containers or folds 40 of different thicknesses.

Means are also provided for temporarily holding a container in correct relation to a carrier and a funnel before the same is firmly gripped by the jaws, and for this purpose, the lever formed by the pair of plates 45 is provided with a spring 62 which normally bears against the fixed jaw 41. Consequently, while the movable jaw 44 is in open position as shown in Fig. 9, an empty container or bag may be applied to the part 25a of the funnel member and the opposite sides thereof forming the folds 40 may be inserted between the fixed jaw 41 and the spring 62. In order that the spring may not interfere with the closing of the jaws, the movable jaw member 44 is provided with a groove or recess 63 into which the spring 62 may enter when the movable jaw is in gripping position, see Fig. 11.

It will be obvious from Fig. 1 that when any container carrier is at station A, an operator may insert a bag about the lower portion of the funnel member and place the sides thereof between the stationary jaw 41 and the spring 62, and when the turret has rotated a container carrier to station B, the cam 60 has caused the movable jaw member to grip the gathered portions 40 of the bag, so that the bag is ready to be moved to the gross filling station C. By means of this construction, the operator need not hold the container until it is gripped between the jaws, and the danger of having the operator's fingers pinched between the jaws is eliminated.

When the machine is used for filling flexible containers, such as bags, it may be desirable to provide means for preventing the swinging of the bags during the intermittent movement of the turret of the machine and for this purpose, the rotatable tube 24 may be provided with a plurality of outwardly extending arms 65 rigidly secured thereto and to the outer ends of which are secured suitable bag engaging members 66 which may, for example, as shown in Fig. 1, be of partly cylindrical form to extend partly about a bag supported on the turret 22.

When the containers are advanced to station C, Fig. 1, by the intermittent advance of the container carriers, a quantity of material measured by volume is deposited in the containers. The volume deposited in the container is such that not more, and preferably less, than the required weight of material is supplied to a container at station C. Any suitable means may be provided for supplying this volume of material to a container, and in the construction shown for this purpose, a bin for the material is provided which has an arcuate inclined wall 69 mounted on the post or column 18, Figs. 2 and 12, an inwardly or substantially radial wall 70, and a movable circular inclined bottom or side 71 to the outer face of which a plurality of buckets or volume measuring containers are secured to receive material through openings 72 which are in registration with the upper open ends of buckets. These buckets are preferably made adjustable as to size and each includes a cylindrical portion 73 secured to the movable bottom or side 71 about an opening 72 therein, and telescoping portion 74 which may be held in adjusted position with relation to the part 73 of the bucket by any suitable means, such as a bolt 75, Fig. 2, secured to the part 73 and passing through a slot 76 of the telescoping portion 74 of a bucket.

The inclined rotatable bottom or side 71 may be supported in its operative position in any suitable or desired manner. In the construction shown, the arm 18, which extends upwardly from the base is formed so as to extend through or about the portion of the fixed side 69 of the bin, and then over the upper portion of the bin to support a clamp 78 to which the upper end of a stationary post or shaft 79 is secured, and the upwardly extending standard 17 is also provided with a laterally extending arm 80, to the end of which the lower end of the post 79 is clamped. A tubular member or hollow drive shaft 81 is rotatable about the fixed post 79 and the bottom or side 71 is suitably secured to the upper end of this hollow shaft 81. The lower end of the hollow shaft 81 is secured to a bevel gear 82 which meshes with another bevel gear 83 secured to an upright shaft 84 journalled to rotate within the hollow cylindrical or tubular standard 17.

Each of the volume measuring buckets is provided with a bottom 86 which is closed during that part of the revolution of the bottom or side 71 during which the bucket is located in a lower position to receive material from the bin, so that the material will fill the buckets. As the disk is rotated further, the bucket will move upwardly into positions above the bin, whereupon a portion of the material in the upper portion of the bucket will be discharged back into the bin. In this manner, the material which is handled will not be damaged during the movement of the buckets from material receiving positions below the bin into positions above the bin, so that when the machine is used for bagging potatoes, oranges, apples, or other articles, none of the articles will be damaged during the operations of filling and removing excess material from the buckets. When the bucket is out of contact with the material in the bin, it will, of course, not be entirely filled, but the size or depth of the buckets may be readily regulated by adjusting the telescoping part 74 thereof relatively to the part 73, so that the buckets will hold slightly less material than finally desired in the containers 20.

Means are provided for automatically opening and closing the bottoms 86 of the buckets, so that the contents of the buckets will be discharged into the containers when the buckets are in their upper positions. In the particular construction shown for this purpose, see particularly Figs. 1 and 2, the bottom of each bucket is secured to and forms a part of a lever comprising a pair of plates 87 pivoted at 88 on the part 74 of the bucket. At the outer ends of these plates, weights 89 are provided and the plates 87 constituting the lever also have a pivotal connection 90 with a latch member 92 having a notch 93 in the outer end thereof. The outer end of this latch member is confined between a pair of posts 94 extending outwardly from a strap 95 secured to the part 74 of the bucket. This strap also is provided with ears or lugs for the pivot 88. A pin 96 connects the two posts 94 and also limits the movement of the latch 92. When the bottom of the bucket is in closed position as shown in the lower bucket illustrated in Fig. 2, the notch 93 in the latch member 92 will engage the pin 96, being urged into this engaging position by a spring 97 so that the bottom of the bucket will be held in closed position. When the bottom of the bucket is open as shown in the upper bucket in Fig. 2, the latch 92 is pressed against the action of the spring 97 so that the notched portion 93 moves out of engagement with the pin 96, whereupon the notch portion of the latch may move beyond the pin 96 and thus permit the bottom 86 to be opened.

The bottom or side 71 which constitutes a side wall of the bin is moved in synchronism with the turret 22, as will be hereinafter explained, and consequently, when an empty container moves into position C indicated in Fig. 1, means are provided for releasing the latch 92 and thus permitting the contents of the bucket to discharge into the container. Any suitable means for releasing the latch may be provided, and in the construction illustrated by way of example, a cam 99 is provided for this purpose, see also Fig. 12, which is arranged to engage the latch to move the same out of its holding position in which the bucket is closed. This cam 99 may be supported in any suitable manner, and in the construction illustrated, the standard 18 is provided with an arm 100 on which the cam is mounted. In order to facilitate the action of the cam on the latch, the latch preferably has an anti-friction roller 101 mounted thereon which may engage the cam to press the latch toward the bucket, and thus release the bottom of the bucket. When the filled bucket is in the upper position shown in Fig. 2, the weight of the contents of the bucket will cause the bottom 86 to move into open position, thus dropping the material on a chute 102 which directs the same into the funnel 25 to which a bag or other container is attached. If the part 74 of the bucket is adjusted to vary the capacity of the same, all of the actuating mechanism for the bottom 86 will be adjusted with the part 74 of the bucket. For ordinary adjustments the cam 99 is of sufficient width to remain in contact with the roller 101. If a greater adjustment of the bucket part 74 is made, the arm of the cam 99 may be removed from the supporting arm 100 and replaced with a cam having a longer or shorter arm. After the contents of the upper bucket have been discharged and this bucket moves into the next position, the latch moves out of engagement with the cam 99, whereupon the weight 89 will cause the bottom 86 to swing into closing position, and the spring 97 will restore the latch into the locking position in which the pin 95 engages in the notch in the end of the latch. The bucket is then ready to receive another charge of material from the bin 70. Material may be fed to the bin for filling the buckets in any suitable or desired manner, for example, by means of a conveyor or belt 103 as shown in Fig. 2.

After a preliminary volume of material, preferably less than the final amount desired, has been deposited in the container at station C, the turret moves the container carrier to the next station D, in which a small amount of material is gradually added to the container until the weight of the same is up to that desired. For this purpose, there is provided on the stationary disk or supporting member 34 a weighing scale of any suitable or desired type, that shown including a base 104 secured to the disk 34, and a beam having a platform or pan 105 at one end thereof on which weights 106 may be placed, and having a platform or pan 107 at the other end to which the weight of the container and its contents or a proportional part of such weight may be transmitted by the container carrier. The scale beam preferably also has a pointer or arm 108 which swings with the beam.

The weight of the container or a proportional part thereof may be transmitted in any suitable manner to the scale pan 107 when the container carrier arrives at station D. In the construction shown by way of example, the lower stationary track ring 35 has a suitable post or standard 110 secured thereto and extending upwardly therefrom and on the upper end of this post, a lever or beam 111 is pivotally mounted. It will be noted in referring to Fig. 1 that the upper ring or track 36 has a gap therein at 112 and the lever or beam 111 has one end 114 thereof formed to bridge the gap in such a manner that when a container reaches station D, the roller 32 of the container carrier will bear against the undersurface of the part 114 of the beam or lever 111. The other end of this beam or lever bears against the scale platform 107, being for this purpose provided with an adjustable screw 115, the lower end of which bears on the scale base 104. This screw extends through a threaded hole in the beam 111 and is adjustable so that the parts will bear the correct relation to each other. Consequently, the weight of the container through the pivoted container carrier and the roller 32 thereof, and through the beam or lever 111 exerts a downwardly directed force on the scale pan 107.

Means are provided for supplying additional material to the container at station D, if the weight of the container and contents is less than that desired. The action of this additional feed mechanism is controlled by the scale so that if the weight of the container and its contents is equal to or more than that required, no additional material will be fed to the container, but if the weight of the container and contents is less than that desired, the secondary feed mechanism is actuated. This secondary feed mechanism may be of any suitable or desired construction, and as illustrated by way of example, this mechanism includes a conveyor chain 120 guided over a sprocket wheel 121 mounted in such relation to the funnel 25 when positioned at station D so that material will drop from the upper end of the conveyor chain 120 into the funnel 25. If the secondary feed device is used for supplying potatoes, apples, oranges or similar articles to the containers, the sprocket chain may be provided with pockets each of such size as to receive one potato or other article, the pockets being formed by brackets 122 secured to the links of the chain 120. The chain or conveyor preferably is arranged within a trough 123 and extends into a suitable hopper or bin 124 to receive the articles.

Any suitable mechanism may be provided for driving the conveyor for the secondary feed mechanism when the weight of the container and contents is less than that desired. In the construction shown for this purpose, see particularly Figs. 1 and 6, the sprocket wheel 121 is driven by means of a shaft 125, one end of which is journalled in a bearing 127 and which has the sprocket wheel 121 keyed or otherwise secured thereto. 128, Fig. 1, represents a worm gear rotatably mounted on the shaft 125 and driven by means of a worm 129 secured on a shaft 130, which is the main drive shaft of the machine. This shaft also has a pulley 131 mounted thereon driven by means of a belt 132 which is driven from a pulley 133 mounted on an upright shaft 134 of a motor 135 or of a speed reducing gearing driven by the motor. The worm gear 128 may rotate relatively to the shaft 125 and power may be transmitted from the worm gear to the shaft 125 through the medium of a pair of friction drive members or disks 136 and 137, both of which are keyed, splined or otherwise secured to the shaft 125 to rotate therewith. A coil spring 138 extends about this shaft and bears at one end against the friction disk 137 and the pressure of the spring may be varied by means of nuts 140 engaging the threaded end 141 of the shaft 125. Consequently, it will be obvious that the shaft 125 is rotated from the worm gear 128 through the friction disks 136 and 137.

The shaft 125 which actuates the conveyor 120 is rotated only when additional material is to be supplied to a container at station D, and consequently, means are provided for preventing rotation of the shaft 125 except when such additional material is required. For this purpose, a ratchet wheel 144 is rigidly secured to the shaft 125, see particularly Figs. 1 and 6, and a dog 145 is provided which may engage the teeth of the ratchet wheel. This dog is formed on one arm of a three-armed or T-lever having two other arms 147 and 148, the arm 148 extending downwardly. This lever is pivoted at 149 on a stationary part 150 of the frame of the machine and a spring 151 normally urges this lever into a position in which the dog 145 engages a tooth of the ratchet wheel 144, to stop rotation of the shaft 125 and to stop the feed of material to a container at station D.

The arm 147 of the bell crank lever may be engaged by means of a latch 153 pivoted at 154 on the stationary part 150 of the frame of the machine and spring 155 urges the latch into position to engage the end of the arm 147 of the three-armed lever, to hold this lever in a position in which the dog 145 is out of engagement with the ratchet wheel 144, thus permitting the shaft 125 to rotate to actuate the secondary feed. The latch 153 is connected by means of a link to a core 157 of a solenoid or electromagnet 158 which is connected by suitable conductors to a switch or contact device 160 by means of which the circuit through the solenoid or magnet 158 may be closed or broken. The circuit closing device may be of any desired construction, and as shown for this purpose, a lever 161 pivoted at 162 is provided, one arm of which is adapted to be engaged by the pointer or arm 108 of the scale when the same is swung by the beam of the scale into a position in which the container has acquired the desired weight. When the pointer 108 swings the lever 161 about its pivot to close the circuit to the magnet or solenoid to energize the same, the latch 153 will be drawn out of engagement with the arm 147 and thus permit the dog 145 to be swung into engagement with the ratchet wheel 144 by means of the spring 151 so that the feed of additional material to the container is interrupted. The filling of a container having been completed, the turret is given another partial rotation so that the container supporting member with the correctly filled container thereon is moved from station D to station E from where it may be discharged from the machine. Just before the container arrives at station E the cam 59 acting on the roler 58 releases the movable gripping jaws, and thus lets the container drop. The container may be removed from the machine in any suitable manner, for example, by means of a conveyor belt 165 or other suitable means.

Means are also provided for moving the turret 32 and the bucket carrying bottom or side 71 immediately after a container in station D has been filled with the required weight. The power for actuating the movable parts of the machine is derived from the shaft 139, which, as shown in Fig. 4, extends into the hollow base 15 of the machine and is suitably journalled in the base in bearings 167 and 168. This shaft has a flanged collar or sleeve 170 rigidly secured thereto which is provided with a plurality of posts or studs 171. The shaft 139 also has a sleeve 172 extending about a portion thereof and provided at the upper end thereof with a radially extending flange 173. As clearly shown in Fig. 5, a dog or latch 175 is pivoted at 176 on the flange 173 and has an outwardly extending arm or lug 177. The dog or latch 175 is normally urged to swing about its pivot into engagement with one of the studs or projections 171 on the flange or disk of the sleeve 170, for example, by means of a coil spring 178. Consequently, when the dog or latch 175 is in engagement with one of the studs 171, rotation of the shaft 139 will be transmitted to the sleeve 172.

The sleeve 172 has a sprocket wheel 180 fixed thereon which cooperates with a sprocket chain 181. The sprocket chain also engages a sprocket wheel or gear 183 which is secured to and rotates the shaft 84 for driving the bucket carrying bottom, or side 71 through the medium of the bevel gears 83 and 82.

Simultaneously with the driving of the bucket carrying bottom or side 71, the turret 22 is also turned through a part of a revolution and this may be accomplished in any suitable or desired manner. In the particular construction illustrated by way of example, the sleeve 172 is provided at the lower portion thereof with a cam 185 which is formed to engage a bar 186 pivoted on a stud or post 187 firmly secured on the base 15. This rod or bar 186 is preferably provided with an anti-friction wheel or roller 188 which rides on the surface of the cam 185 and a spring 189 is provided which urges the rod or bar 186 in a direction to cause the wheel 188 to engage the cam 185. The free end of the bar or rod 186 is pivotally connected with one end of a link 190. The other end of this link is connected with an arm or segment 191 which is rigidly secured on a portion of the hollow shaft or tube 24 on the portion thereof within the hollow base 15. This hollow shaft has a disk 192 secured thereto which has a plurality of studs 193 extending through the disk and beyond the upper and lower faces thereof. The arm or segmental member 191 has a dog or latch 194 pivoted thereon at 195, see particularly Fig. 3. One end of this latch is formed to engage the portions of the studs 193 which extend below the disk 192. A spring 196 connected with the latch urges the same against the stop 197, in which position the latch may engage any of the studs 193 to turn the disk 192 and thus advance the turret 22 through a part of a revolution when the cam 185 moves the bar or rod 186 to the right in Fig. 3. When the rod or bar 186 is moved back into the position shown in Fig. 3 by the spring 189, the dog or latch 194 will move into engagement with another stud 193 in position to advance the turret through another part of the revolution.

In order to prevent the turret, due to momentum, from moving beyond the position to which it is advanced by the dog 194 and also to hold the turret against rotation when material is being fed to the containers, a brake or friction device 199 is provided within the base which is pressed by a spring 200 into engagement with the periphery of the disk 192. Any other means for holding the turret against movement except when actuated by the dog 194 may be provided.

Means are also provided for automatically starting the movement of the parts of the mechanism when the container at station D has acquired the desired weight, and when the scale through its indicator 108 has caused the dog 153 to release the three-armed lever and thus cause the dog 145 to engage the ratchet wheel 144 and stop the secondary feed of material to the container. When this occurs, the arm 148 of the three-armed lever, under the action of the spring 151, engages an arm 205 secured on a shaft or rod 206, see Figs. 3, 4, 6 and 7. The lower end of the shaft or rod 206 within the hollow base 15 is provided with another arm 207 biased by the spring 207'. When the arm 148 of the three-armed lever engages the upper arm 205 of the shaft 206, it swings the lower arm 207 out of the position shown in Fig. 5, and thus releases the dog 175 and permits the same to engage a stud 171 of the flange or disk of the collar or sleeve 170, and thus causes the sleeve 172 to rotate with the shaft 130, thus turning the bucket carrying bottom or side 71 through the medium of the sprocket chain 181 and turning the turret 22 through the medium of the cam 185.

In order to stop the rotation of the bucket carrying bottom or side 71 and the turret 22 after they have advanced through the required fraction of a revolution, a second upright rod or shaft 210, Figs. 3 and 4, is provided which has an arm 211 thereon which extends into the path of movement of the upper portions of the studs 193 on the disk 192. This arm 211 is normally held by a spring 212 against a fixed stop 213 but when engaged by a stud 193 during a part of the revolution of the disk 192, the arm 211 will be swung from the full line position shown in Fig. 3 into the broken line position, thus causing a slight turning movement of the upright rod or shaft 210. This rod or shaft 210 is provided at the upper end thereof with a laterally extending arm 215 which extends into close proximity to the arm 148 of the three-armed lever. Consequently, when the arm 215 engages the arm 148, it swings the three-armed lever about its pivot into a position in which the dog 145 is moved out of engagement with the ratchet wheel 144 and in which the arm 147 is swung downwardly to be engaged by the dog 153. This starts the movement of the conveyor 120 of the secondary feed mechanism so that material will be fed in small increments to the container which has just been placed into position at station D, and this secondary feed will be continued until the scale actuates the circuit closing member 160 to energize the solenoid 158 to again disengage the arm 147 of the three-armed lever and thus stop the secondary feed and start the next advance movement of the turret 25 and the bucket carrying bottom or side 71.

The machine described has the advantage that the containers are filled accurately according to weight and the action of the machine is rapid because of the fact that most of the filling is accomplished in the preliminary operation in which material in bulk is preliminarily fed to the containers, so that only small quantities of additional material need be fed thereto by means of the secondary feed mechanism.

It will be understood that various changes in the details, materials, and arrangements of parts which have been herein described and illustrated in order to explain the nature of the invention, may be made by those skilled in the art within the principle and scope of the invention, as expressed in the appended claims.

We claim as our invention:

1. A container filling machine including a plurality of carriers having means for supporting containers thereon, means for advancing said carriers intermittently to different stations of said machine, said carriers being pivotally mounted intermediate of the ends thereof on said advancing means, container supporting means at one end of each of said carriers at one side of the pivotal mounting thereof, a track with which the other ends of said carriers engage to hold said carriers against swinging about their pivotal mountings due to the weight of said containers, mechanism at one of said stations for depositing in a container at said station a volume of material not exceeding the weight ultimately desired, said track terminating in advance of a succeeding feeding station, a weighing scale having a part to which the weight to be determined is applied, a lever pivoted intermediate of its ends at said succeeding station and having one end engaging said scale part and having the other end arranged at the termination of said track in position to be engaged by a carrier when at said succeeding station, means for supplying additional material in small increments to a container at said succeeding station while said carrier is operatively associated with said scale part through said lever, and means actuated by said scale to stop the feed of additional material to a container when the container at said succeeding station attains the weight desired.

2. A container filling machine including a plurality of carriers having means for supporting containers thereon, a turret on which said carriers are pivotally mounted intermediate of the ends thereof, one end of each carrier extending outwardly beyond said turret and being provided with means for supporting a container thereon, the other ends of said carriers extending inwardly toward the axis of revolution of said turret, a substantially annular track with which said other ends of said carriers engage to hold said carriers against swinging on their pivots due to the weight of said containers, mechanism at one of said stations for depositing in a container at said station a volume of material not exceeding in weight that ultimately desired, said track terminating adjacent to the next succeeding station, a weighing scale fixedly mounted on said machine and having a part to which the weight to be determined is applied, a lever pivoted intermediate of its ends and having one end thereof in engagement with said part of said scale and having the other end thereof extending into a position in alinement with the end of said track for engagement with said other ends of said carriers when moved into said succeeding station, said lever transmitting to said scale part a proportional part of the weight of the container at said succeeding station, means for supplying additional material in small increments to said container when at said succeeding station, means actuated by said scale when the container at said station attains the weight desired to stop the feed of additional material to said container, and mechanism actuated by the movement of said scale into position to stop said additional feed, for moving said turret to advance said containers from one station to another.

3. A bag filling machine including a plurality of carriers, means for releasably attaching a bag to each one of said carriers, mechanism for intermittently advancing said carriers from station to station on said machine, a weighing scale, means at one of said stations for operatively connecting said carrier with said scale to determine the weight of the bag supported thereby, a conveyor for supplying material to a bag while the carrier therefor is operatively connected with said scale, a drive for said conveyor, a part movable into and out of a position to stop said conveyor, mechanism controlled by said scale for moving said part into position to stop said conveyor when the bag and contents connected with said scale have attained the desired weight, means actuated by the movement of said part into conveyor stopping position for actuating said carrier advancing mechanism, and means at a succeeding station for releasing said bag from said carrier for removal of the bag from the machine.

4. A bag filling machine including a plurality of carriers each having a lower portion shaped to fit into the open upper end of a bag and an upper funnel-shaped portion for guiding material into said lower portion for passage into a bag, means for releasably securing the upper ends of open bags to said lower portions of said carriers, a rotatable turret in which said carriers are mounted and which is rotatable for advancing said carriers intermittently to different stations of said machine, mechanism on one of said stations for depositing in a bag at that station a volume of material not exceeding in weight that ultimately desired, a weighing scale having a part cooperating with said carriers when positioned at a succeeding station to transmit the weight of the bag and contents to said scale for actuating the same, means for supplying additional material in small increments to a bag at a succeeding station, means actuated by said scale to stop the feed of additional material to a bag at said succeeding station when a bag at such succeeding station has attained the desired weight, and means at another station for releasing said bag from its carrier for discharge from the machine.

5. A bag filling machine according to claim 4, in which said carriers for said bags are mounted for limited up and down movement on said turret and are each provided with a funnel at one portion thereof, means for attaching the bags to the lower ends of said funnels to receive material from said funnels, and means on other portions of said carriers when in said succeeding station to transmit the weight of said containers to said scale part.

6. A container filling machine having a plurality of carriers for the containers, a turret in which said carriers are mounted, means for intermittently applying rotary motion to said turret to move said carriers to different stations, each of said carriers including a funnel-shaped part to receive material, mechanism at one of said stations for securing a container to a carrier, said mechanism including spring means for suspending containers with the lower portion of the funnel extending into the same, clamps for engaging said containers while supported by said spring means prior to the advancing of the containers into position to receive the material, mechanism at the next station for depositing into a container a volume of material not exceeding in weight that finally desired in the containers, mechanism at a succeeding station for supplying material in small increments to said container, a scale at said succeeding station responsive to changes in weight of a container while at said succeeding station, means controlled by said scale for stopping the feed of material to said container at said succeeding station and for causing said turret to advance said carriers, and means at another station for releasing said containers from said carriers.

7. A bag filling machine including a plurality of carriers, means for releasably attaching bags to said carriers, mechanism for intermittently advancing said carriers from station to station on said machine, means at one of said stations for depositing into a bag a quantity of material of less weight than that desired, a weighing scale at a succeeding station, means at said succeeding station for operatively connecting said carrier with said scale to determine the weight of the bag and contents supported thereby, a conveyor for supplying material to said bag while the carrier therefor is operatively connected with said scale, a drive for said conveyor, a part movable into and out of a position to stop said conveyor, mechanism controlled by said scale for moving said part into position to stop said conveyor when the bag connected with said scale has attained the desired weight, means actuated by the movement of said part into conveyor stopping position for actuating said carrier advancing mechanism, means actuated by the movement of said carrier advancing mechanism to move said part out of its position to stop said conveyor, and means at a succeeding station for releasing said bag from said carrier for removal of the bag from the machine.

HOWARD G. ALLEN.
HARRY A. SMITH.

REFERENCES CITED

The following references are of record in the file of this patent:

UNITED STATES PATENTS

| Number | Name | Date |
| --- | --- | --- |
| 720,008 | Doble | Feb. 10, 1903 |
| 1,410,958 | Reynolds | Mar. 28, 1922 |
| 1,713,575 | Warwick | May 21, 1929 |
| 2,060,645 | Suppiger et al. | Nov. 10, 1936 |
| 2,100,874 | Ryan | Nov. 30, 1937 |
| 2,254,384 | Nowak | Sept. 2, 1941 |
| 2,259,777 | Politsch et al. | Oct. 21, 1941 |
| 2,280,614 | Ayars | Apr. 21, 1942 |
| 2,317,865 | Talbot | Apr. 27, 1943 |
| 2,464,545 | Ahlburg | Mar. 15, 1949 |